United States Patent
Krupka

(10) Patent No.: US 7,349,495 B2
(45) Date of Patent: Mar. 25, 2008

(54) SOFT BITS NORMALIZATION APPARATUS, METHOD, AND SYSTEM

(75) Inventor: Eyal Krupka, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 10/670,982

(22) Filed: Sep. 25, 2003

(65) Prior Publication Data

US 2005/0069057 A1    Mar. 31, 2005

(51) Int. Cl.
    H03D 1/00      (2006.01)
    H04L 27/06     (2006.01)
(52) U.S. Cl. .................. 375/340; 375/229; 375/262; 375/341
(58) Field of Classification Search ............. 375/319, 375/340, 229–236
    See application file for complete search history.

(56) References Cited

U.S. PATENT DOCUMENTS

| | | | |
|---|---|---|---|
| 6,449,320 B1* | 9/2002 | Lindoff ............... | 375/319 |
| 6,744,814 B1* | 6/2004 | Blanksby et al. ........ | 375/232 |
| 7,099,384 B1* | 8/2006 | Jalali et al. .............. | 375/229 |
| 2002/0085649 A1* | 7/2002 | Hwang ................. | 375/319 |
| 2002/0186761 A1* | 12/2002 | Corbaton et al. ........ | 375/231 |
| 2003/0099310 A1* | 5/2003 | Zvonar ................. | 375/340 |
| 2003/0231662 A1* | 12/2003 | Klingenbrunn et al. .... | 370/536 |
| 2004/0037262 A1* | 2/2004 | Tanada ................. | 370/342 |
| 2005/0111525 A1* | 5/2005 | Driesen et al. .......... | 375/147 |

OTHER PUBLICATIONS

Visoz, R., et al., "Turbo Equalization and Incremental Redundancy for Advanced TDMA Systems", *IEEE*, (2001), pp. 1629-1633.

* cited by examiner

*Primary Examiner*—Curtis B. Odom
(74) *Attorney, Agent, or Firm*—Dana B. Lemoine; Lemoine Patent Services, PLLC

(57) ABSTRACT

A receiver estimates a channel parameter from a received signal. The channel parameter may a DC signal level, a carrier to interference ratio, a noise spectrum, or the like. The receiver performs channel equalization and produces estimated symbols. The estimated symbols are remodulated and the channel parameter is re-estimated. An initial estimation error is calculated as the difference between the two estimates. The estimated symbols are weighted using the initial estimation error, and channel decoding is performed. Estimated symbol weights may be reduced when the initial estimation error is above a threshold, and may be increased when the initial estimation error is below a threshold.

21 Claims, 3 Drawing Sheets

SOFT BITS NORMALIZATION APPARATUS, METHOD, AND SYSTEM

FIELD

The present invention relates generally to receivers, and more specifically to soft bits normalization in receivers.

BACKGROUND

Signals received by "receivers" travel through "channels." A channel may be any medium through which a signal can travel. Channels may have undesired effects on signals, such as amplitude attenuation or phase distortion. An equalizer at the receiver may attempt to remove from the signal the effects of the channel.

DESCRIPTION OF EMBODIMENTS

Figure 1:
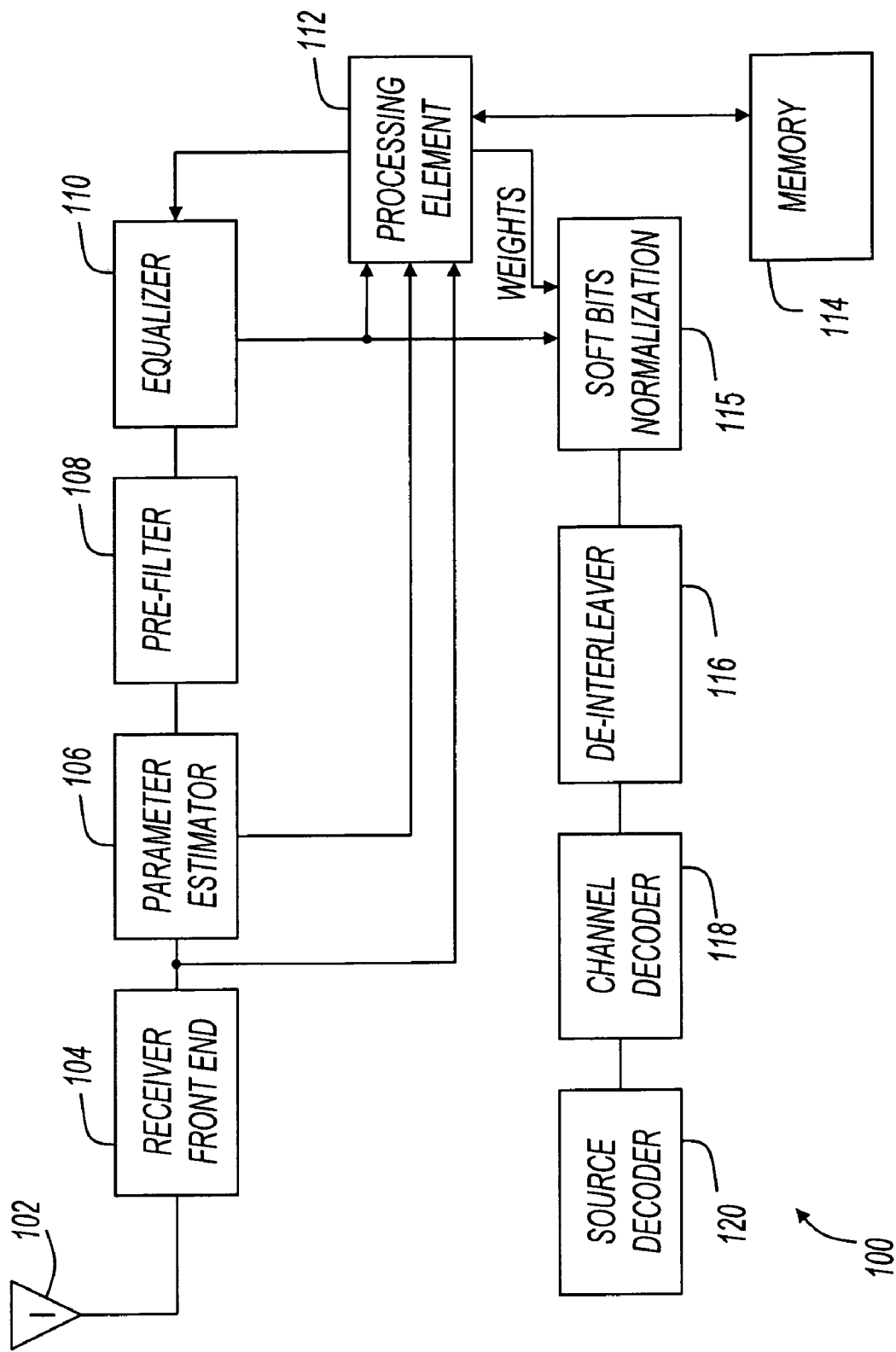
FIG. 1 shows a block diagram of an electronic system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of an electronic system. System 100 includes antenna 102, receiver front end 104, parameter estimator 106, pre-filter 108, equalizer 110, soft bits normalization block 115, de-interleaver 116, channel decoder 118, source decoder 120, processing element 112, and memory 114. In operation, system 100 receives a signal using antenna 102, and the signal is processed by the various elements shown in FIG. 1. Antenna 102 may be a directional antenna or an omni-directional antenna. As used herein, the term omni-directional antenna refers to any antenna having a substantially uniform pattern in at least one plane. For example, in some embodiments, antenna 102 may be an omni-directional antenna such as a dipole antenna, or a quarter wave antenna. Also for example, in some embodiments, antenna 102 may be a directional antenna such as a parabolic dish antenna or a Yagi antenna.

Receiver front end 104, which is coupled to antenna 102, receives the signal and performs "front end" processing. For example, receiver front end 104 may include a low noise amplifier (LNA), filters, frequency conversion circuitry, or the like. The invention is not limited by the contents or function of receiver front end 104.

Parameter estimator 106 receives a signal from receiver front end 104 and estimates the values of one or more parameters. The parameter(s) that are estimated may be any parameter associated with the received signal. For example, the parameter may describe the signal source (transmitter parameters), the channel through which the signal has traveled (channel parameters), or the like. Examples of parameters include: channel estimation; estimation of direct current (DC) level of the received signal; carrier to interference ratio (CIR) estimation, noise spectrum estimation, and the like. Parameter estimator 106 may also perform operations on the signal. For example, parameter estimator 106 may remove an estimated DC level from the signal.

Parameter estimator 106 may also provide parameter values to pre-filter 108, equalizer 110, and processing element 112. Pre-filter 108 and equalizer 110 may perform pre-filtering and equalization based, at least in part, on one or more parameter values received from parameter estimator 106.

The output of equalizer 110 includes estimated symbols, also referred to as "soft decisions," or "soft-bits." The soft-bits are provided to soft bits normalization block 115, where they are "normalized," or "weighted," based on estimated parameters. The normalized soft-bits are also passed through de-interleaver 116 where they are de-interleaved based on the interleaving (if any) performed at the transmitter (not shown).

The normalization of soft-bits improves the performance of channel decoder 118 by assigning lower weights to soft-bits or groups of soft-bits based on estimated parameter values that indicate a lower confidence in the soft-bits. Likewise, higher weights may be assigned to soft-bits or groups of soft-bits based on parameter values that indicate a higher confidence in the soft-bits.

Channel decoder 118 receives normalized estimated soft-bits, and performs channel decoding. In some embodiments, channel decoder 118 employs a Viterbi decoder, but the present invention is not limited in this regard. Source decoder 120 decodes symbols that are output from channel decoder 118. The implementation of source decoder 120 is not limited by the present invention.

Processing element 112 is coupled to various other elements shown in FIG. 1. For example, processing element 112 is coupled to receive a signal from receiver front end 104, estimated parameter values from parameter estimator 106, and estimated soft-bits from equalizer 110. In some embodiments of the present invention, processing element 112 modifies "weights," or "normalization factors" of soft-bits based on various criteria. For example, processing element 112 may remodulate soft-bits that are output from equalizer 110 and re-estimate parameters. Based in part on the re-estimation of parameters, processing element 112 may modify the normalization of soft-bits.

As previously described, in some embodiments of the present invention, parameter estimator 106 may estimate and remove the DC level of the signal. Processing element 112 may remodulate the soft-bits from equalizer 110 and re-estimate the DC level by comparing the received signal to the remodulated signal. The difference between the original estimate of the DC level and the re-estimated DC level is referred to herein as the "initial DC estimation error." When the original DC estimation error is small, the weights of the corresponding soft-bits may be increased. When the original DC estimation error is large, the weights of the corresponding soft-bits may be decreased.

Similarly, processing element 112 may re-estimate any parameter and modify soft-bit weights accordingly. For example, processing element 112 may remodulate the soft bits and re-estimate parameters other than the DC level of the signal. Weights for the soft-bits may be modified based on how closely the re-estimation matches the original estimation.

In some embodiments, equalization may be re-performed based on how well the re-estimation matches the original estimation. For example, a difference between the original estimation and the re-estimation may be taken to yield an estimation error. When the estimation error is above a threshold, processing element 112 may command equalizer 110 to re-perform equalization using the re-estimated parameter value rather than the original estimation.

Example systems represented by FIG. 1 include modems, cellular phones, personal digital assistants, wireless local area network interfaces, and the like. System 100 may be adapted to receive signals of various formats and at various frequencies. For example, system 100 may be adapted to receive time domain multiple access (TDMA) signals, code domain multiple access (CDMA) signals, global system for mobile communications (GSM) signals, or any other type of communications signals. The present invention is not limited in this regard.

In some embodiments of the present invention, system 100 receives GSM signals in multiple "slots" over multiple frequency bands. A slot may include data symbols as well as a training sequence of symbols that are useful in various embodiments of the present invention. For example, in some embodiments, the DC level of the received signal is estimated, the DC level is removed, and equalization is performed. The processing element may then remodulate the symbols, and re-estimate the DC level of the received signal. The re-estimated DC level may be based on the symbols output from the equalizer, in addition to the known symbols in the training sequence.

A weight corresponding to an entire slot of a GSM signal may be modified at once. For example, if the original estimation of a parameter differs from the re-estimated parameter (the estimation error is large), then a weight corresponding to the normalization of the whole slot may be decreased. Likewise, if the estimation error is small, then the weight corresponding to the normalization of the whole slot may be increased. Further, a weight corresponding to multiple slots of a GSM signal may be modified at once.

Processing element 112 may be any type of processing element capable of performing actions described herein. For example, processing element 112 may be a processor such as a microprocessor, digital signal processor, or the like. Processing element 112 may also include hardware dedicated to particular tasks, such as remodulation of soft-bits. The particular arrangement of processing element 112 is not a limitation of the present invention.

Memory 114 represents an article that includes a machine readable medium. For example, memory 114 represents any one or more of the following: a hard disk, a floppy disk, random access memory (RAM), read only memory (ROM), flash memory, CDROM, or any other type of article that includes a medium readable by processing element 112. Memory 114 can store instructions for performing the execution of the various method embodiments of the present invention.

In operation of some embodiments, processing element 112 reads instructions and data from memory 114 and performs actions in response thereto. For example, various method embodiments of the present invention may be performed by processor 112 while reading instructions from memory 114.

Systems, processing elements, equalizers, parameter estimators, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, parameter estimator 106 may be represented as polygons assigned to layers of an integrated circuit.

Figure 2:
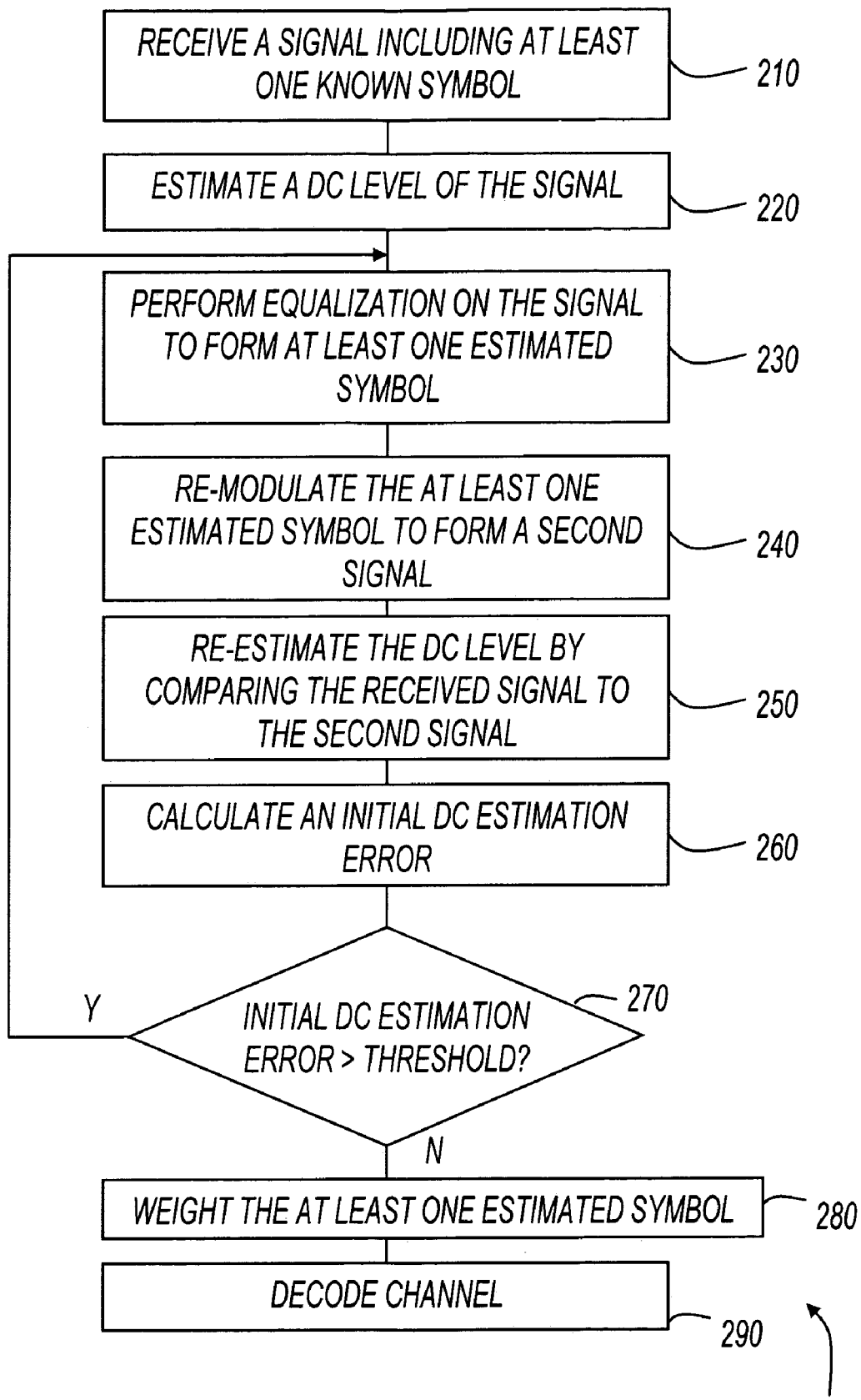
FIGS. 2 and 3 show flowcharts in accordance with various embodiments of the present invention.

FIG. 2 shows a flowchart in accordance with various embodiments of the present invention. In some embodiments, method 200, or portions thereof, is performed by a processor, embodiments of which are shown in the various figures. In other embodiments, method 200 is performed by a control circuit, an integrated circuit, or an electronic system. Method 200 is not limited by the particular type of apparatus or software element performing the method. The various actions in method 200 may be performed in the order presented, or may be performed in a different order. Further, in some embodiments, some actions listed in FIG. 2 are omitted from method 200.

Method 200 is shown beginning with block 210 where a signal including at least one known symbol is received. For example, in some embodiments, a received signal may include a training sequence of known symbols. The training sequence may be at the beginning of a frame, packet, slot, or the like. The training sequence may also be in the center or at the end. Further, the training sequence may be any length.

At 220, a DC level of the signal is estimated. In some embodiments, the DC level is also subtracted from the received signal. For example, in some embodiments, the received signal is in digital form, represented in a series of digital samples. In these embodiments, the DC level may be subtracted from each of the digital samples representing the received signal.

At 230, equalization is performed on the signal to form at least one estimated symbol. The estimated symbol may also be referred to as a "soft decision" or "soft-bits." At 240, the at least one estimated symbol is remodulated to form a second signal. This may correspond to a processing element such as processing element 112 (FIG. 1) executing instructions to remodulate the estimated symbols using software. This may also correspond to a dedicated hardware circuit or a mixture of hardware and software that performs remodulation.

At 250, the DC level is re-estimated by comparing the received signal to the second signal, and at 260, an initial DC estimation error is calculated as the difference between the original DC level estimation and the DC level estimation after remodulation. At 270, the initial DC estimation error is compared against a threshold, and if the error is above the threshold, method 200 is repeated starting at 230 where equalization is re-performed using the DC level estimation of the remodulated signal rather than the original DC level estimation.

At 280, the at least one estimated symbol is weighted, and at 290, the channel is decoded using the weight assigned at 280. In some embodiments of the present invention, the weighting of soft-bits is performed by normalizing the log-likelihood (LLR) values, where the LLR of a bit is defined as:

$$LLR = \log\left[\frac{P(\text{bit}=0)}{P(\text{bit}=1)}\right]$$

where P(bit=i) is the estimated probability of the bit being equal to i.

Normalization may be performed by multiplying the LLR values of all bits by a positive constant (C). The value of this constant may be set to 1 when the estimation error is small, and may decrease in value as the estimation error increases. In some embodiments, the LLR of all bits in a block used by the channel decoder may be used to estimate the transmitted block.

In some embodiments, the LLR values are estimated by the equalizer based on estimated Carrier to Interference Ratio (CIR). If the initial DC estimation error is large, the estimate of LLR values provided by the equalizer may not be accurate. In these embodiments, the accuracy of the LLR may be improved by performing the various actions of method 200.

Figure 3:
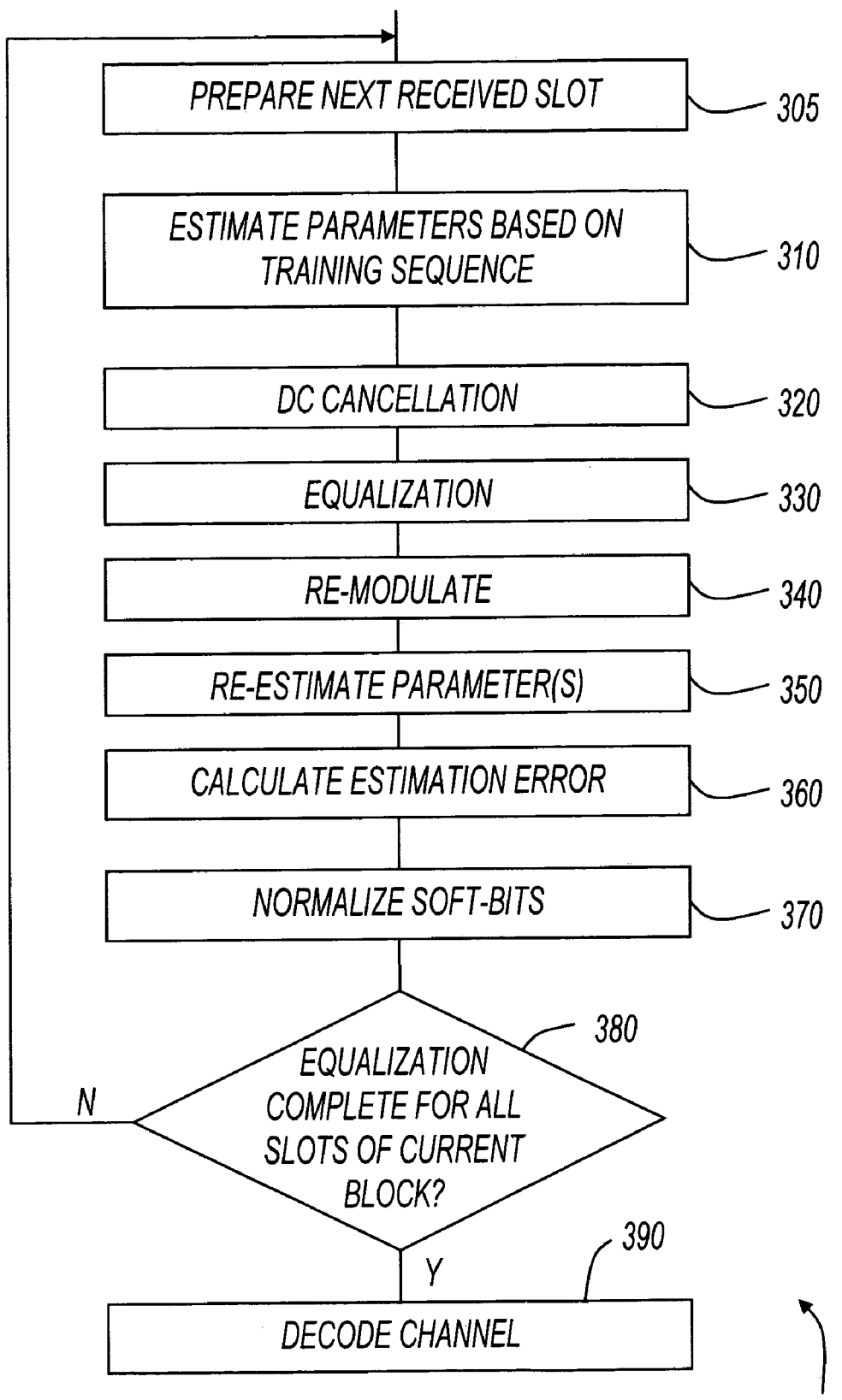

FIG. 3 shows a flowchart in accordance with various embodiments of the present invention. In some embodiments, method 300, or portions thereof, is performed by a processor, embodiments of which are shown in the various figures. In other embodiments, method 300 is performed by a control circuit, an integrated circuit, or an electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300. In some embodiments, method 300 is performed in a system the receives a GSM signal.

Method 300 is shown beginning with block 305 where a received slot is prepared. In some embodiments, a received signal may include multiple slots, possibly spread over multiple frequencies. Each slot may be prepared by frequency translation, timing recovery, or the like. At 310, one or more parameters are estimated based on a training sequence. For example, in embodiments that receive a GSM signal, a training sequence of 26 symbols is included within each slot, and parameters such as DC signal level, channel estimation, and others may be estimated based on the known training sequence.

At 320, a DC level of the signal is subtracted from the signal to perform "DC cancellation." For example, in some embodiments, the received signal is in digital form, represented in a series of digital samples. In these embodiments, the DC level may be subtracted from each of the digital samples representing the received signal.

At 330, equalization is performed on the signal to form at least one estimated symbol. The estimated symbol may also be referred to as a "soft decision" or "soft-bits." At 340, the at least one estimated symbol is remodulated to form a second signal. This may correspond to a processing element such as processing element 112 (FIG. 1) executing instructions to remodulate the estimated symbols using software. This may also correspond to a dedicated hardware circuit or a mixture of hardware and software that performs remodulation.

At 350, one or more parameters are re-estimated, and at 360, an initial estimation error is calculated as the difference between the original parameter estimation and the parameter estimation after remodulation. In some embodiments, the re-estimation is performed by comparing the received signal and the remodulated signal. At 370, soft-bits are normalized based, at least in part, on the initial estimation error. When the initial estimation error is high, less weight may be given to the soft-bits during normalization. Likewise, when the initial estimation error is low, more weight may be given to the soft-bits during normalization.

At 380, a determination is made as to whether equalization is complete for all slots of the current block to be decoded. For example, in embodiments that utilize a Viterbi decoder, a group of soft-bits may be decoded as a single block that includes data from multiple slots. The action of 380 verifies that all of the slots to be decoded together have been equalized. At 390, the channel is decoded.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    receiving a first signal including at least one known symbol;
    estimating a DC level of the first signal;
    performing equalization on the first signal to form at least one estimated symbol;
    remodulating the at least one estimated symbol to form a second signal;
    re-estimating the DC level by comparing the first signal and the second signal;
    calculating an initial DC estimation error by comparing estimates of the DC level of the first signal and re-estimates of the DC level;
    weighting the at least one estimated symbol, wherein weighting comprises reducing a weight when the initial DC estimation error is above a threshold; and
    performing channel decoding.

2. The method of claim 1 wherein receiving a signal including at least one known symbol comprises receiving a training sequence of symbols.

3. The method of claim 2 further comprising repeating a list of actions for a plurality of slots of a global system for mobile communications (GSM) signal.

4. A method comprising:
    receiving a first signal including at least one known symbol;
    estimating a DC level of the first signal;
    performing equalization on the first signal to form at least one estimated symbol;
    remodulating the at least one estimated symbol to form a second signal;
    re-estimating the DC level by comparing the first signal and the second signal;
    calculating an initial DC estimation error by comparing estimates of the DC level of the first signal and re-estimates of the DC level;

weighting the at least one estimated symbol, wherein weighting comprises increasing a weight when the initial DC estimation error is below a threshold; and performing channel decoding.

5. The method of claim 4 wherein receiving a signal including at least one known symbol comprises receiving a training sequence of symbols.

6. The method of claim 5 further comprising repeating the listed actions for a plurality of slots of a global system for mobile communications (GSM) signal.

7. A method comprising:

receiving a signal that includes a training sequence of symbols;

estimating a channel parameter from the signal;

performing equalization to produce estimated symbols;

remodulating the estimated symbols and re-estimating the channel parameter;

calculating an initial estimation error by comparing results from estimating the channel parameter and re-estimating the channel parameter; and weighting the estimated symbols, wherein weighting comprises reducing a weight when the initial estimation error is above a threshold; and performing channel decoding.

8. The method of claim 7 wherein estimating a channel parameter comprises estimating a DC level of the signal.

9. The method of claim 7 wherein estimating a channel parameter comprises estimating a carrier to interference ratio.

10. The method of claim 7 wherein estimating a channel parameter comprises estimating a noise spectrum.

11. The method of claim 7 further comprising re-performing equalization when the initial estimation error is above a threshold.

12. The method of claim 7 wherein receiving a signal comprises receiving a global system for mobile communications (GSM) signal.

13. A computer-readable medium having machine-accessible instructions stored thereon that when accessed result in a machine performing:

remodulating a training sequence of symbols from soft decisions;

calculating an estimation error from received signal samples and remodulated signal samples; and weighting the soft decisions in part by the estimation error, wherein weighting the soft decisions comprises increasing a weight when the estimation error is small.

14. The computer-readable medium of claim 13 wherein calculating an estimation error comprises comparing an estimation of a DC level of the received samples to a DC level of remodulated signal samples.

15. The computer-readable medium of claim 13 wherein weighting the soft decisions further comprises decreasing a weight when the estimation error is large.

16. An apparatus comprising:

a parameter estimator adapted to estimate a channel parameter;

an equalizer coupled to the parameter estimator, the equalizer adapted to equalize a channel based at least in part on an estimate of the channel parameter; and a processing element adapted to compare received signal samples and remodulated signal samples, calculate an initial estimation error from the received signal samples and the remodulated signal samples, and to weight soft decisions by reducing a weight when the initial estimation error is above a threshold.

17. The apparatus of claim 16 wherein the parameter estimator is adapted to estimate a DC level of a signal.

18. The apparatus of claim 16 wherein the parameter estimator is adapted to estimate a carrier interference ratio of the signal.

19. An electronic system comprising:

an omni-directional antenna;

a parameter estimator to estimate a channel parameter from a signal received from the omni-directional antenna;

an equalizer coupled to the parameter estimator, the equalizer to equalize a channel based at least in part on an estimate of the channel parameter; and a processing element to compare received signal samples and remodulated signal samples, calculate an initial estimation error from the received signal samples and the remodulated signal samples, and to weight soft decisions by reducing a weight when the initial estimation error is above a threshold.

20. The electronic system of claim 19 wherein the parameter estimator is adapted to estimate a DC level of the signal.

21. The electronic system of claim 19 wherein the parameter estimator is adapted to estimate a carrier interference ratio of the signal.

* * * * *